US008964203B2

(12) United States Patent
Nishikawa

(10) Patent No.: US 8,964,203 B2
(45) Date of Patent: Feb. 24, 2015

(54) IMAGE FORMING APPARATUS AND IMAGE READING APPARATUS INCLUDING INTERFACES THAT RECEIVE COMMANDS TO TRANSITION FROM POWER SAVING MODES

(75) Inventor: Naoki Nishikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 57 days.

(21) Appl. No.: 13/415,810

(22) Filed: Mar. 8, 2012

(65) Prior Publication Data
US 2012/0274973 A1  Nov. 1, 2012

(30) Foreign Application Priority Data

Apr. 28, 2011  (JP) ................................. 2011-100805

(51) Int. Cl.
*G06K 15/00*  (2006.01)
*H04N 1/00*  (2006.01)

(52) U.S. Cl.
CPC ........ *H04N 1/00896* (2013.01); *G06K 15/4055* (2013.01); *G06K 15/4045* (2013.01); *H04N 2201/0094* (2013.01)
USPC ....... 358/1.14; 455/67.11; 710/315; 713/320; 713/323; 713/324; 713/340

(58) Field of Classification Search
USPC ......... 358/1.14; 399/79; 455/67.11; 709/224, 709/239, 240, 242; 713/320, 323, 324, 340
See application file for complete search history.

(56) References Cited

U.S. PATENT DOCUMENTS

| 6,122,696 | A * | 9/2000 | Brown et al. .................. 710/307 |
| 6,594,785 | B1 * | 7/2003 | Gilbertson et al. ............. 714/48 |
| 7,500,014 | B1 * | 3/2009 | Jacobson et al. .............. 709/239 |
| 2006/0059291 | A1 * | 3/2006 | Rosing .......................... 710/305 |

(Continued)

FOREIGN PATENT DOCUMENTS

| JP | 2001-075685 A | 3/2001 |
| JP | 2003-200635 A | 7/2003 |

(Continued)

OTHER PUBLICATIONS

Japan Patent Office, Notification of Reasons for Refusal for Japanese Patent Application No. 2011-100805 (counterpart Japanese patent application), dispatched Apr. 16, 2013.

(Continued)

*Primary Examiner* — Houshang Safaipour
*Assistant Examiner* — Edwin S Leland, III
(74) *Attorney, Agent, or Firm* — Baker Botts L.L.P.

(57) ABSTRACT

An image forming apparatus includes: an image forming unit; a power supply controller controls the image forming apparatus to operate in a power saving mode, in which supply of power to the image forming unit is cut off, and a normal mode; and a plurality of interfaces that receives a transition command for transitioning from the power saving mode to the normal mode. The power supply controller is configured to perform: an interface-power supply process of supplying power to at least one interface; a determining process of determining whether availability is high or low for an operating interface receiving power supply in the interface-power supply process; and a changing process of changing a power supply target from the operating interface to an idle interface when the availability of the operating interface is determined to be low.

19 Claims, 7 Drawing Sheets

(56) References Cited

U.S. PATENT DOCUMENTS

| | | | |
|---|---|---|---|
| 2007/0058190 A1* | 3/2007 | Harumichi | 358/1.13 |
| 2008/0025273 A1* | 1/2008 | Sano | 370/338 |
| 2008/0046542 A1* | 2/2008 | Sano | 709/218 |
| 2008/0201594 A1* | 8/2008 | Narushima | 713/324 |
| 2008/0305743 A1* | 12/2008 | Aithal et al. | 455/67.11 |
| 2009/0047991 A1* | 2/2009 | Elg | 455/552.1 |
| 2009/0055673 A1* | 2/2009 | Kitajima | 713/340 |
| 2009/0063877 A1 | 3/2009 | Lewis et al. | |
| 2009/0073481 A1* | 3/2009 | Ferlitsch et al. | 358/1.14 |
| 2009/0142089 A1* | 6/2009 | Kouno | 399/79 |
| 2009/0235098 A1 | 9/2009 | Matsunaga | |
| 2009/0275338 A1* | 11/2009 | Twitchell, Jr. | 455/442 |
| 2011/0286027 A1* | 11/2011 | Nozawa | 358/1.14 |
| 2011/0302350 A1* | 12/2011 | Hsu et al. | 710/315 |
| 2012/0005243 A1* | 1/2012 | Van der Merwe et al. | 707/812 |
| 2012/0158944 A1* | 6/2012 | Tiwari et al. | 709/224 |
| 2012/0257431 A1* | 10/2012 | Suzuki et al. | 363/132 |
| 2012/0274972 A1* | 11/2012 | Nishikawa | 358/1.14 |
| 2012/0278643 A1* | 11/2012 | Nishikawa | 713/323 |
| 2013/0084812 A1* | 4/2013 | Churei | 455/73 |
| 2013/0121157 A1* | 5/2013 | Logvinov et al. | 370/238 |
| 2013/0222833 A1* | 8/2013 | Hirano | 358/1.13 |

FOREIGN PATENT DOCUMENTS

| | | | | |
|---|---|---|---|---|
| JP | 2004-098532 A | | 4/2004 | |
| JP | 2008-204209 A | | 9/2008 | |
| JP | 2008-300922 A | | 12/2008 | |
| JP | 2012232539 A | * | 11/2012 | B41J 29/38 |
| JP | 2013080393 A | * | 5/2013 | G06F 1/32 |
| JP | 2013162476 A | * | 8/2013 | H04W 52/02 |

OTHER PUBLICATIONS

United States Patent and Trademark Office, Final Office Action for U.S. Appl. No. 13/415,806, mailed Apr. 9, 2014.

* cited by examiner

| OPERATING IF | THRESHOLD TIME PERIOD | CHANGE DESTINATION |
|---|---|---|
| OPERATION PANEL | - | - |
| NETWORK IF | TWO HOURS | OPERATION PANEL |
| FAX IF | - | - |
| WIRELESS COMMUNICATION IF | 30 MINUTES | NETWORK IF |
| USB IF | 30 MINUTES | OPERATION PANEL |
| PRINTER IF | TWO HOURS | OPERATION PANEL |

US 8,964,203 B2

IMAGE FORMING APPARATUS AND IMAGE READING APPARATUS INCLUDING INTERFACES THAT RECEIVE COMMANDS TO TRANSITION FROM POWER SAVING MODES

CROSS-REFERENCE TO RELATED APPLICATIONS

This application claims priority from Japanese Patent Application No. 2011-100805 filed on Apr. 28, 2011, the entire subject matter of which is incorporated herein by reference.

TECHNICAL FIELD

The present invention relates to an image forming apparatus and an image reading apparatus having a power saving mode for suppressing power consumption, and more specifically, to an image forming apparatus and an image reading apparatus having a plurality of interfaces for receiving a transition command for transitioning from a power saving mode to a normal mode.

BACKGROUND

There have been proposed an electronic apparatus such as a printer or a scanner handling an image which, when the electronic apparatus is not used, transitions from a normal mode to a power saving mode, in which some functions are deactivated to suppress power consumption, so as to save electric power. When the electronic apparatus operates in the power saving mode, power is not supplied to any interface other than an interface for receiving a transition command for transitioning from the power saving mode to the normal mode.

For example, there have been proposed a printer, which has a plurality of interfaces for receiving the transition command, and which is configured to select some interfaces to be used among the plurality of interfaces according to automatic selection, user's designation, a frequency of use, or the like, and not to supply power to interfaces except for the selected interfaces.

SUMMARY

Illustrative aspects of the present invention provide an image forming apparatus and an image reading apparatus which are unlikely to force inconvenience upon a user even when some of a plurality of interfaces have low availability.

DETAILED DESCRIPTION

<General Overview>

Figure 1:
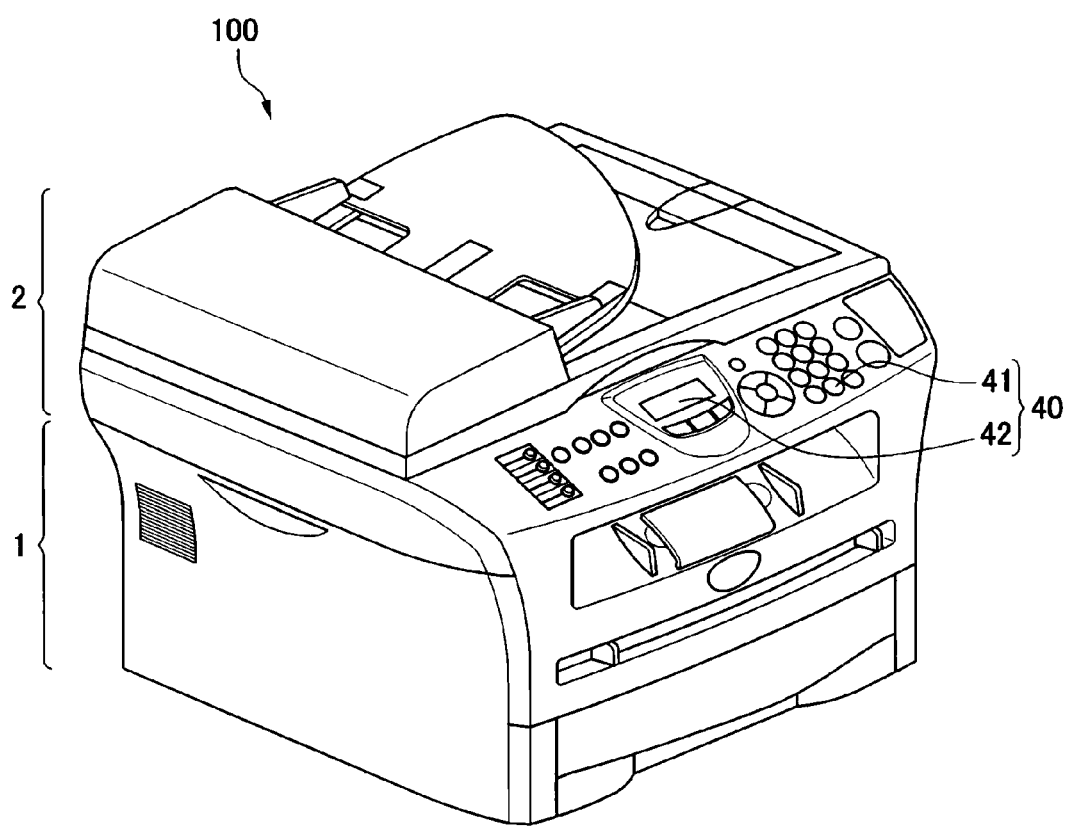
FIG. 1 is a perspective view illustrating an appearance of a multi-function peripheral (MFP) according to an exemplary embodiment.

In the above-described related-art printer, if an interface for receiving a transition command in the power saving mode has low availability, the related-art printer may force great inconvenience upon a user.

Therefore, illustrative aspects of the present invention provide an image forming apparatus and an image reading apparatus which are unlikely to force inconvenience upon a user even when some of a plurality of interfaces have low availability.

According to a first illustrative aspect of the present invention, there is provided an image forming apparatus comprising: an image forming unit configured to form an image; a power supply controller configured to control the image forming apparatus to operate in a power saving mode, in which supply of power to the image forming unit is cut off, and a normal mode, in which supply of power to the image forming unit is performed, wherein the power supply controller is configured to be switched between the power saving mode and the normal mode; and a plurality of interfaces configured to receive a transition command for transitioning from the power saving mode to the normal mode, wherein the power supply controller is configured to perform: an interface-power supply process of supplying power to at least one of the plurality of interfaces; a determining process of determining whether availability is high or low for an operating interface receiving power supply in the interface-power supply process; and a changing process of changing a power supply target from the operating interface to at least one of idle interfaces other than the operating interface in a case where the power supply controller in the determining process determines that the availability of the operating interface is low.

The image forming apparatus of the present invention has the power saving mode and the normal mode as modes for controlling supply of power to the image forming unit. Further, the image forming apparatus has the plurality of interfaces capable of receiving a transition command for transition from the power saving mode to the normal mode. The image forming apparatus of the present invention determines whether availability of each operating interface is high or low. It can be determined whether the availability is high or low, for example, on the basis of a communication state and a frequency of use. If it is determined that the availability is low, power supply to at least one of the idle interfaces starts.

That is, in a situation in which the availability of an operating interface is low, such as a case where the operating interface is disabled, and a case where the operating interface has not been used for a long time, inputting a transition command may become difficult. For this reason, in those situations, the image forming apparatus of the present invention starts to supply power to at least one of the idle interfaces such that the corresponding interface changes into an operating interface. Therefore, the availability of each operating interface increases. As a result, an improvement in usability can be expected.

According to a second illustrative aspect of the present invention, in the image forming apparatus, wherein in the case where the power supply controller in the determining process determines that the availability of the operating interface is low, the power supply controller in the changing process cuts off the power supply to the operating interface.

With respect to an interface having low availability, continuous power supply is likely to be wasted. Meanwhile, with respect to that interface, cutting off the power supply is a minor disadvantage for the user. Therefore, it is preferable to cut off the power supply to the interface having low availability.

According to a third illustrative aspect of the present invention, in the image forming apparatus, wherein the power supply controller in the determining process is further configured to: determine whether the operating interface is disabled; and in a case where the operating interface is determined to be disabled, determine that the availability of the disabled interface is low.

In a case where an operating interface is disabled, the disabled operating interface cannot be used. Therefore, it is preferable to determine that the availability of the disabled interface is low.

According to a fourth illustrative aspect of the present invention, in the image forming apparatus, wherein the power supply controller is further configured to perform: a diagnosing process of, after performing the changing process, diagnosing whether the disabled interface, which has been determined to be disabled in the determining process, becomes enabled; and a second changing process of, in a case where the disabled interface is diagnosed to become enabled, cutting off the power supply to the interface having been started in the changing process.

In a case where a former operating interface is recovered from the disabled state, it is preferable to return the interfaces to their original states. That is, it is preferable to change the current operating interface, which has been changed from an idle interface, to the idle interface; and change the recovered former operating interface to the operating interface.

According to a fifth illustrative aspect of the present invention, in the image forming apparatus, wherein the power supply controller is further configured to perform a selecting process of, in a case where the power supply controller in the determining process determines that the availability of the operating interface is low, allowing a user to select an idle interface from among the idle interfaces, and wherein the power supply controller in the changing process starts to supply power to the idle interface selected in the selecting process.

According to such configuration, if the user is offered a choice, it is possible to improve usability.

According to a sixth illustrative aspect of the present invention, in the image forming apparatus, wherein the power supply controller in the changing process does not set a disabled idle interface as the power supply target. According to a seventh illustrative aspect of the present invention, in the image forming apparatus, wherein the power supply controller is further configured to perform a checking process of checking whether the idle interface selected in the selecting process is enabled, and wherein in a case where the selected idle interface checked in the checking unit is disabled, the power supply controller in the selecting process allows the user to select another idle interface other than the disabled idle interface.

Even if power is supplied to a disabled interface, the disabled interface cannot receive any transition command. For this reason, it is preferable not to set the disabled interface as an operating interface.

According to an eighth illustrative aspect of the present invention, in the image forming apparatus, wherein in a case where a duration when the operating interface is not used is equal to or longer than a threshold time period, the power supply controller in the determining process determines that the availability of the operating interface is low.

With respect to an interface which has not been used for a long time, even if it is determined that availability of that interface is low, a disadvantage for the user is minor.

According to a ninth illustrative aspect of the present invention, there is provided an image reading apparatus comprising: an image reading unit configured to read an image; a power supply controller configured to control the image reading apparatus to operate in a power saving mode, in which supply of power to the image reading unit is cut off, and a normal mode, in which supply of power to the image reading unit is performed, wherein the power supply controller is configured to be switched between the power saving mode and the normal mode; and a plurality of interfaces configured to receive a transition command for transitioning from the power saving mode to the normal mode, wherein the power supply controller is configured to perform: an interface-power supply process of supplying power to at least one of the plurality of interfaces; a determining process of determining whether availability is high or low for an operating interface receiving power supply in the interface-power supply process; and a changing process of changing a power supply target from the operating interface to at least one of idle interfaces other than the operating interface in a case where the power supply controller in the determining process determines that the availability of the operating interface is low.

According to a tenth illustrative aspect of the present invention, there is provided a multi-function peripheral comprising: an image forming unit configured to form an image; an image reading unit configured to read an image; a power supply controller configured to control the multi-function peripheral to operate in a power saving mode, in which supply of power to the image forming unit and the image reading unit is cut off, and in a normal mode, in which supply of power to the image forming unit and the image reading unit is performed; and a plurality of interfaces configured to receive a transition command for transitioning from the power saving mode to the normal mode, wherein the power supply controller is configured to perform: an interface-power supply process of supplying power to at least one of the plurality of interfaces; a determination process of determining whether availability is high or low for an operating interface receiving power supply; and a change process of changing a power supply target from the operating interface to at least one of idle interfaces other than the operating interface in a case where the availability of the operating interface is determined to be low.

According to the illustrative aspects of the present invention, it is possible to implement an image forming apparatus and an image reading apparatus which are unlikely to force inconvenience upon the user even if some of a plurality of interfaces have low availability.

<Exemplary Embodiments>

Hereinafter, exemplary embodiments of the present invention will be described in detail with reference to the accompanying drawings. The exemplary embodiments may be implemented by applying the present invention to a multi-function peripheral (MFP) having a power saving mode for suppressing power consumption.

[Configuration of MFP]

As shown in FIG. 1, an MFP 100 according to the exemplary embodiment includes an image forming unit 1 for printing an image on a paper sheet, and an image reading unit 2 for reading an image of a document. The image forming type of the image forming unit 1 may be an electrographic type or an ink-jet type. Also, the image forming unit 1 may be capable of forming color images, or may be capable of forming only monochrome images.

The MFP 100 includes an operation panel 40 on a front side thereof. The operation panel 40 includes a button group 41 including various buttons (for example, a start key, a stop key, and individual buttons of a numeric keypad), and a display unit 42 that is composed of a liquid crystal display. The button group 41 and the display unit 42 enable display of an operation status, and allow a user to perform input operation.

Further, the MFP 100 includes various interfaces for receiving signals from outside. When the MFP 100 operates in the power saving mode, if receiving a transition command through an interface, the MFP 100 switches a mode regarding power supply from the power saving mode to a ready mode (one example of a normal mode). Incidentally, the power saving mode can also be released by operating the operation panel 40. In other words, the operation panel 40 is one of the interface capable of receiving a transition command for transitioning from the power saving mode to the ready mode. Various interfaces and various modes will be described below.

[Electrical Configuration of MFP]

Figure 2:
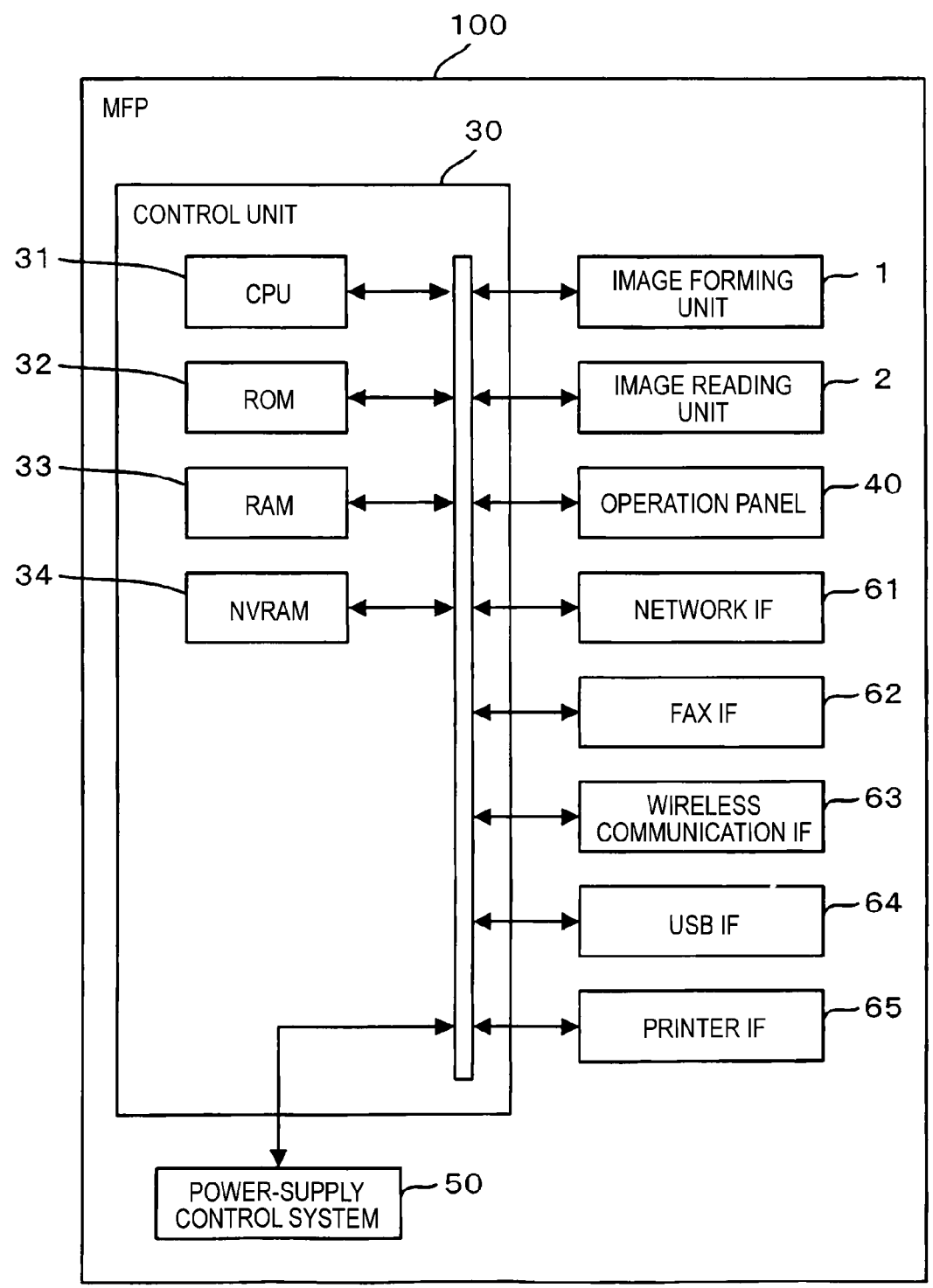
FIG. 2 is a block diagram illustrating an electrical configuration of the MFP shown in FIG. 1.

Subsequently, an electrical configuration of the MFP 100 will be described. As shown in FIG. 2, the MFP 100 includes a control unit 30 including a CPU 31, a ROM 32, a RAM 33, and a non-volatile RAM (NVRAM) 34.

The control unit 30 is electrically connected to the image forming unit 1, the image reading unit 2, the operation panel 40, a power-supply control system 50 for controlling supply of power to each component, and various interfaces such as a network interface 61, a fax interface 62, a wireless communication interface 63, a USB interface 64, and a printer interface 65. For example, the control unit 30 acquires a signal of image data from the image reading unit 2. Further, the control unit 30 outputs a signal for generating a desired image, to the image forming unit 1. Furthermore, the control unit 30 receives signals of various buttons from the button group 41. Moreover, the control unit 30 outputs a signal of contents to be displayed, to the display unit 42.

The ROM 32 stores various control programs for controlling the MFP 100, image processing programs, various options, initial values, and so on. The RAM 33 is used as a work area into which various control programs are read, or as a storage area for temporarily storing image data of a document read by the image reading unit 2 or image data received through various interfaces. The NVRAM 34 is a non-volatile storage means, and is used as a storage area for storing various options, image data, and so on.

The CPU 31 performs operations for implementing various functions, such as an image reading function and an image forming function, in the MFP 100. The CPU 31 functions as a center for control. The CPU 31 stores process results in the RAM 33 or the NVRAM 34 in accordance with control programs read from the ROM 32 and controls each component of the MFP 100.

The network interface 61 is connected to a network, such that the MFP 100 can perform data communication with other information processing apparatuses through the network interface 61. The fax interface 62 is connected to a public line, such that the MFP 100 can perform data communication with an external facsimile and the like, through the fax interface 62. The wireless communication interface 63 establishes wireless communication with other information processing apparatuses, such that the MFP 100 can perform data communication with those information processing apparatuses. The USB interface 64 is directly connected to a USB memory or another information device (such as a card reader), such that the MFP 100 can perform data communication with that information device or the like through the USB interface 64. The printer interface 65 is connected to a printer cable, such that the MFP 100 can perform data communication with another information processing apparatus through the printer interface 65.

[Power Supply Control]

Figure 3:
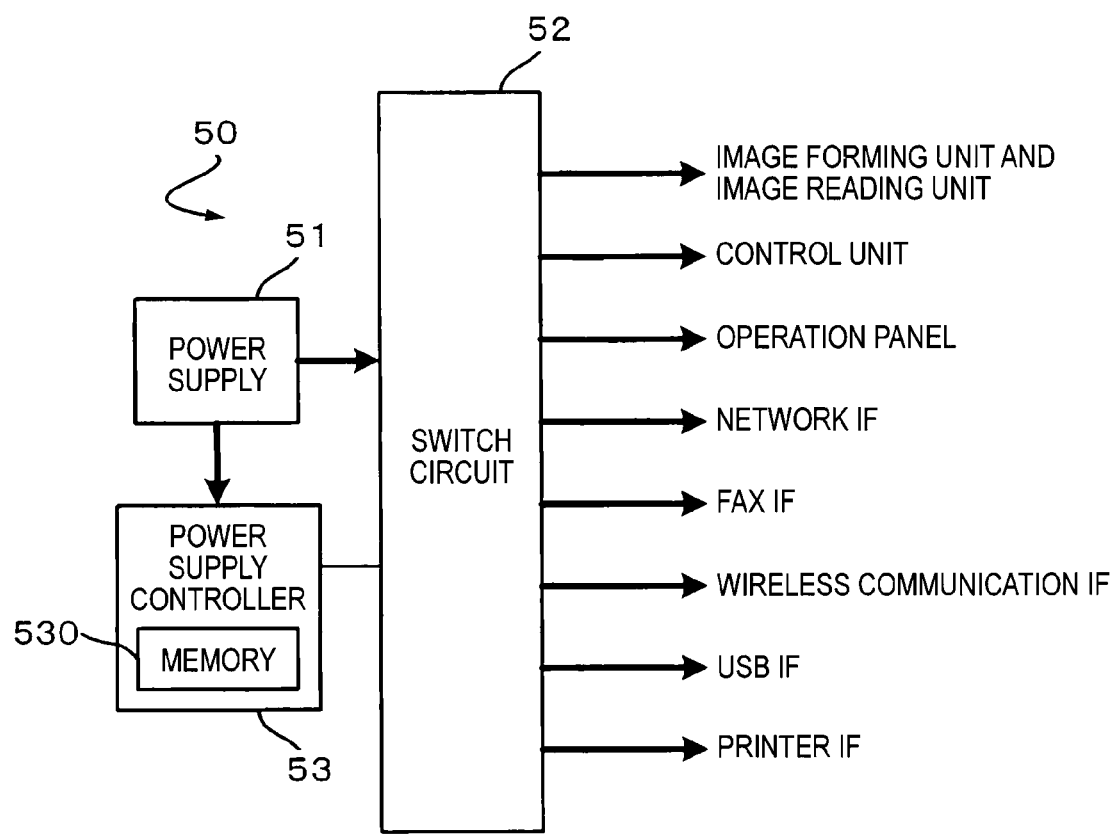
FIG. 3 is a block diagram illustrating a configuration of a power-supply control system.

Subsequently, power supply control of the MFP 100 will be described. As shown in FIG. 3, the MFP 100 includes a power supply 51, a switch circuit 52 for distributing power supplied from the power supply 51, to various components of the MFP 100, and a power supply controller 53 for turning on or off each of various switches of the switch circuit 52, as the power-supply control system 50 (one example of a power supply controller). The power supply controller 53 operates independently from the control unit 30. The power supply controller 53 has a CPU and a memory on its own.

The power supply 51 is composed of a circuit which is connected to, for example, a commercial power supply or a battery. The power supply 51 converts the supplied power into appropriate power and supplies the converted power to each of the components of the MFP 100. The switch circuit 52 switches whether to supply power to each of the components of the MFP 100, on the basis of a command output from the power supply controller 53. Specifically, the MFP 100 has various power supply systems such as a power supply system for the image forming unit 1 and the image reading unit 2, a power supply system for the control unit 30, a power supply system for the operation panel 40, and a power supply system for various interfaces. The switch circuit 52 supplies or cuts off power to each power supply system.

Now, modes of the power-supply control system 50 will be described. The power-supply control system 50 has a ready mode, in which an image can be read or printed, and a power saving mode, in which any image can not be read or printed.

Specifically, in the ready mode, power is supplied to all of the image forming unit 1, the image reading unit 2, the control unit 30, the operation panel 40, and the interfaces 61 to 65, such that a printing operation or a scanning operation becomes possible. On the other hand, in the power saving mode, supply of power to the image forming unit 1 and the image reading unit 2 is cut off, so that printing and reading becomes impossible.

Immediately after the power-supply control system 50 is activated, the power-supply control system 50 operates in the ready mode. Then, in a case where the printing, reading, and user's operation are not performed and duration in which the MFP 100 is not used (hereinafter, referred to as an 'idle time period') is a predetermined time period or more, or in a case where a forced transition command for forcedly performing transition to the power saving mode is input, the power-supply control system 50 transitions from the ready mode to the power saving mode.

Also, the power-supply control system 50 sets interfaces (including the operation panel) to be power-supply continuation targets even if transition to the power saving mode is performed, and stores those interfaces in the memory 530 of the power supply controller 53. Those interfaces are designated by user's operation in the ready mode. At this time, one or more interfaces may be designated.

Incidentally, in order to avoid a state in which it is impossible to receive any transition command, at least one interface is designated.

In the power saving mode, the power-supply control system 50 receives a transition command for transition to the ready mode. When transition to the power saving mode is performed, the power-supply control system 50 continues the power supply to the designated interfaces and cuts off the power supply to the other interfaces. Therefore, only the designated interfaces can receive a transition command. If receiving a transition command through an interface which continuously receives power supply, the power-supply control system 50 returns to the ready mode from the power saving mode. The reception of the transition command may correspond to an operation of the user on the operation panel 40, reception of a signal corresponding to the transition command from another information processing apparatus, or installation of an information device. The reception of the transition command may also correspond to reception of a job from another information processing apparatus.

In the description of the exemplary embodiment, interfaces (i.e., the operation panel 40 and the interfaces 61 to 65 in the exemplary embodiment) capable of receiving a transition command are referred to as an 'interface for return.' Also, an intefrace for return to which power is continuously supplied in the power saving mode is referred to as an 'operating interface,' and an interface for return to which power is not supplied in the power saving mode is referred to as an 'idle interface.'

Whenever the mode of the power supply controller 53 is changed, a signal for supplying or cutting off power to each of various power supply systems is input to the switch circuit 52. The power supply controller 53 receives power directly from the power supply 51 and always operates even in the power saving mode. Therefore, it is possible to control the switch circuit 52 even in the power saving mode.

In the power saving mode, if it is determined that the availability of an operating interface is low, the power supply controller 53 starts to supply power to at least one of the idle interfaces, and cuts off the power supply to the operating interface having been determined to have the low availability. That is, the operating interface having been determined to have the low availability changes into an idle interface, and any of the idle interfaces changes into an operating interface. The number of idle interfaces to be power supply targets may be one or more.

[Power Saving Process]
[First Exemplary Embodiment]

Figure 4:
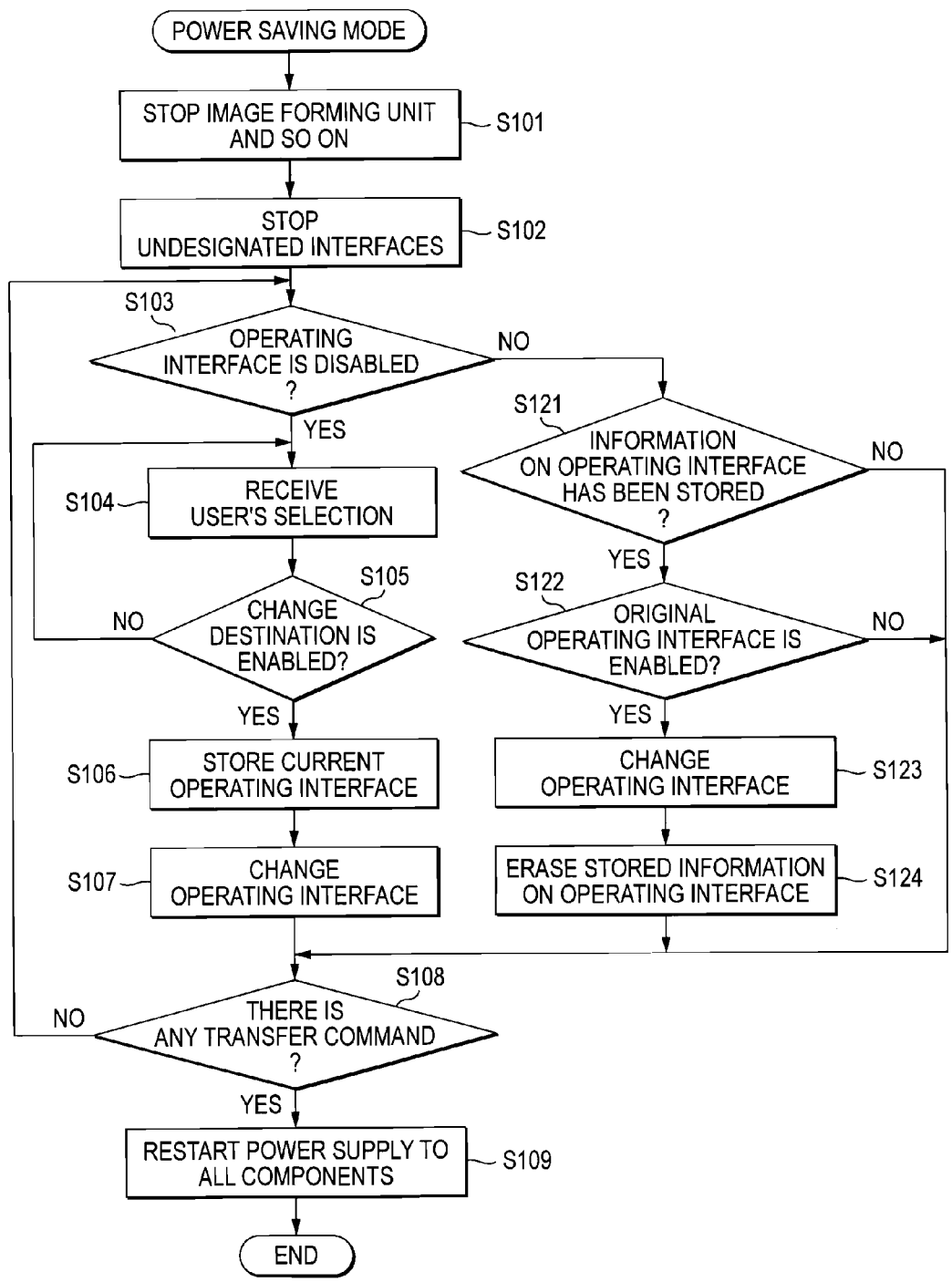
FIG. 4 is a flow chart illustrating a procedure of a power saving process according to a first exemplary embodiment.

Subsequently, the procedure of the power saving process (one example of a determining process, a changing process, a checking process, a diagnosing process, and a second changing process) for implementing an operation of changing a power supply destination in the power saving mode will be described with reference to a flow chart of FIG. 4. If a condition for transition to the power saving mode is satisfied, the power saving process is performed by the power supply controller 53. Incidentally, a case where the condition for transition to the power saving mode is satisfied may correspond to a case where the idle time period is equal to or longer than a predetermined time period.

In the power saving process of the first exemplary embodiment, first, in STEP S101, supply of power to the image forming unit 1 and the image reading unit 2 is cut off. Specifically, a switch, which is connected to the power supply system for the image forming unit 1, and a switch, which is connected to the power supply system for the image reading unit 2, are turned off. In STEP S101, the supply of power to the control unit 30 may also be cut off. Since the power supply controller 53 performing the power saving process operates independent from the control unit 30, even if the supply of power to the control unit 30 is cut off, the power supply controller 53 continues to perform the power saving process. Then, in STEP S102, the power supply to the interfaces for return undesignated as interfaces to operate in the power saving mode is cut off. Incidentally, the order of STEP S101 and STEP S102 may be reversed.

Next, in STEP S103, it is determined whether each operating interface is disabled (one example of a determining process). Here, examples of the disabled state include not only a state in which the operating interface is broken or communication with the operation interface is disconnected but also a state in which communication with the operating interface is unstable due to, for example, a poor radio transmission in wireless communication. In a case where there is a plurality of operating interfaces, it may be determined whether all operating interfaces are disabled, or it may be determined whether at least one of the operating interfaces is disabled.

Figure 5:
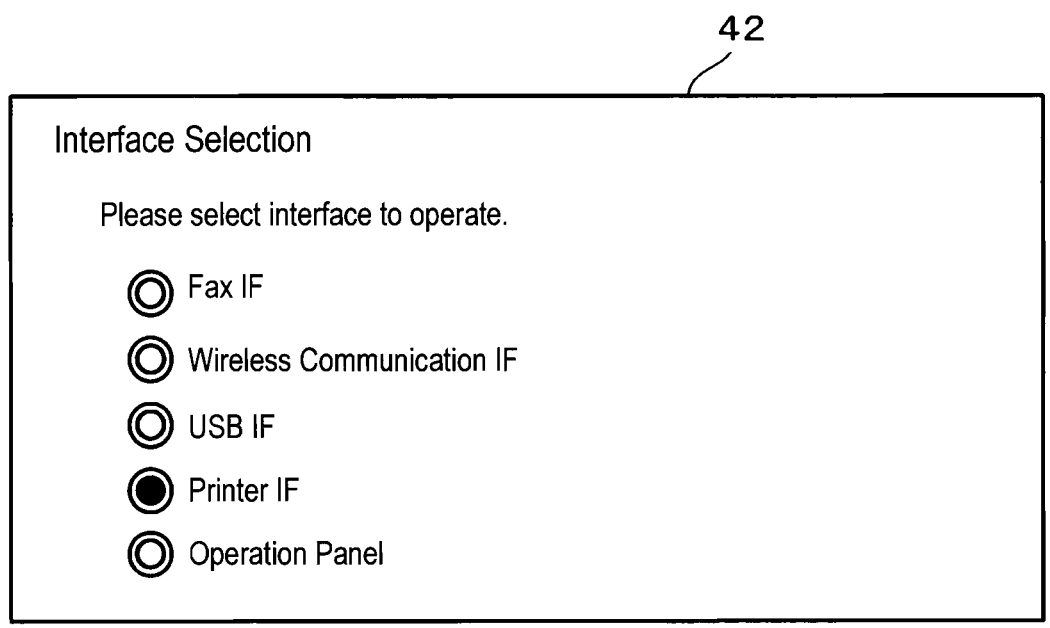
FIG. 5 is a view illustrating a screen for selecting an interface to operate.

In a case where it is determined that an operating interface is disabled (YES in STEP S103), in STEP S104, the idle interfaces are listed on the display unit 42 of the operation panel 40 as shown in FIG. 5, and the user is inquired about an idle interface to be a power supply target. FIG. 5 shows a selection screen which is displayed in a case in which, when the network interface 61 is an operating interface, it is determined that the network interface 61 is disabled. Since the network interface 61 is the origin of change, the network interface 61 is not displayed as an option on the selection screen. As an inquiring means, a selection screen may be displayed on the operation panel 40 or an external apparatus, or a display destination may be designated in advance. In a case where the operation panel 40 is disabled, a display destination to substitute for display of the selection screen may be designated. In a case where the operation panel 40 is not an operating interface at the stage of STEP S104, the power supply to the operation panel 40 restarts temporarily, and after the user selects an idle interface, the power supply to the operation panel 40 is cut off.

After the selection result is input in STEP S104, in STEP S105, it is checked whether the selected interface for return is enabled (one example of a checking process). In a case where the selected interface for return is disabled (NO in STEP S105), the power saving process returns to STEP S104, where an idle interface is selected again. That is, even if power is supplied to a disabled interface, the disabled interface cannot receive any transition command. For this reason, in order to prevent that interface from being selected as an operating interface, an idle interface is selected again.

Incidentally, as a case where an interface for return is disabled, there are a case where the disabled state has been known from the previous stage of STEP S104, and a case where the disabled state was not known at the stage of STEP S104. In the case where the disabled state has been known from the previous stage of STEP S104, it may be made impossible to select the interface for return in STEP S104.

In a case where the selected interface for return is enabled (YES in STEP S105), in STEP S106, information on interfaces for return which has been determined to be disabled and are current operating interfaces is stored in the memory 530 of the power supply controller 53. Then, in STEP S107, the operating interface is changed (one example of a changing process). That is, power supply to the operating interface having been determined to be disabled is cut off such that the operating interface becomes an idle interface, and power supply to the idle interface selected in STEP S104 restarts such that the idle interface becomes an operating interface. Incidentally, any one of the cutoff of the power supply to the operating interface and the restart of power supply to the interface for return may be first performed, or both of them may be performed at the same time. The power supply periods for both interfaces may or may not overlap each other. After STEP S107, the power saving process proceeds to STEP S108, and it is determined whether there is any transition command.

In a case where it is determined in STEP S103 that the operating interface is enabled (NO in STEP S103), in STEP S121, it is determined where there is information on interfaces for return, that is, information on interfaces for return which originally were operating interfaces, stored in the memory 530 of the power supply controller 53. In a case where information on any interface for return has not been stored (NO in STEP S121), it can be determined that change of the operating interface in STEP S107 has not been performed. Therefore, the power saving process proceeds to STEP S108, and it is determined whether there is any transition command.

In a case where information on an interface for return has been stored (YES in STEP S121), it is determined that change of the operating interface in STEP S107 has been performed. In this case, in STEP S122, power supply to the stored interface for return (hereinafter, referred to as an original operating interface) temporarily restarts, and it is determined whether the original operating interface is enabled (one example of a diagnosing process). In a case where the original operating interface is disabled (NO in STEP S122), the power supply to the original operating interface is cut off. Then, the power saving process proceeds to STEP S108, and it is determined where there is any transition command.

Incidentally, as a case where the original operating interface is disabled, there are a case where the disabled state has been known from the previous stage of STEP S122, and a case where the disabled state was not known at the stage of STEP S122. In the case where the disabled state has been known from the previous stage of STEP S122, the power saving process may proceed to STEP S108, without performing STEP S122.

In a case where the original operating interface is enabled (YES in STEP S122), it can be determined that the use state of the original operating interface has been recovered. Therefore, in STEP S123, the operating interface is changed (one example of a second changing process). That is, the power supply to the interface for return having changed into the operating interface in STEP S107 is cut off such that the corresponding interface for return returns to an idle interface, and power supply to the interface for return (the original operating interface) having changed into the idle interface in STEP S107 restarts such that the corresponding interface for return returns to an operating interface. After STEP S123, in STEP S124, the stored information on the interface for return is erased from the memory 530. After STEP S124, the power saving process proceeds to STEP S108, and it is determined whether there is any transition command.

In STEP S108, it is determined whether there is any transition command received through the operating interface. In a case where there is no received transition command (NO in STEP S108), the power saving process proceeds to STEP S103, and the state of the operating interface is determined again. On the other hand, in a case where there is a received transition command (YES in STEP S108), in STEP S109, the supply of power to the image forming unit 1, the image reading unit 2, the control unit 30, and all interfaces for return restarts. Therefore, transition to the ready mode is performed. After STEP S109, the power saving process finishes.

In the power saving process of the first exemplary embodiment, in the power saving mode, in a case where the operating interface is disabled, at least one of other available idle interfaces is changes into an operating interface. Therefore, even if some of a plurality of interfaces are disabled, it is possible to secure at least one interface capable of receiving a transition command.

Further, in the first exemplary embodiment, when the operating interface is changed, the power supply to the operating interface having been determined to be disabled is cut off. However, the power supply to the disabled operating interface may continue. In the case where the power supply continues, when the communication state of the original operating interface is checked in STEP S122, control for supplying or cutting off power to the original operating interface is unnecessary. Incidentally, if the power supply is cut off like the first exemplary embodiment, it is possible to avoid wasted power consumption.

[Second Exemplary Embodiment]
[Power Saving Process]

Figure 6:
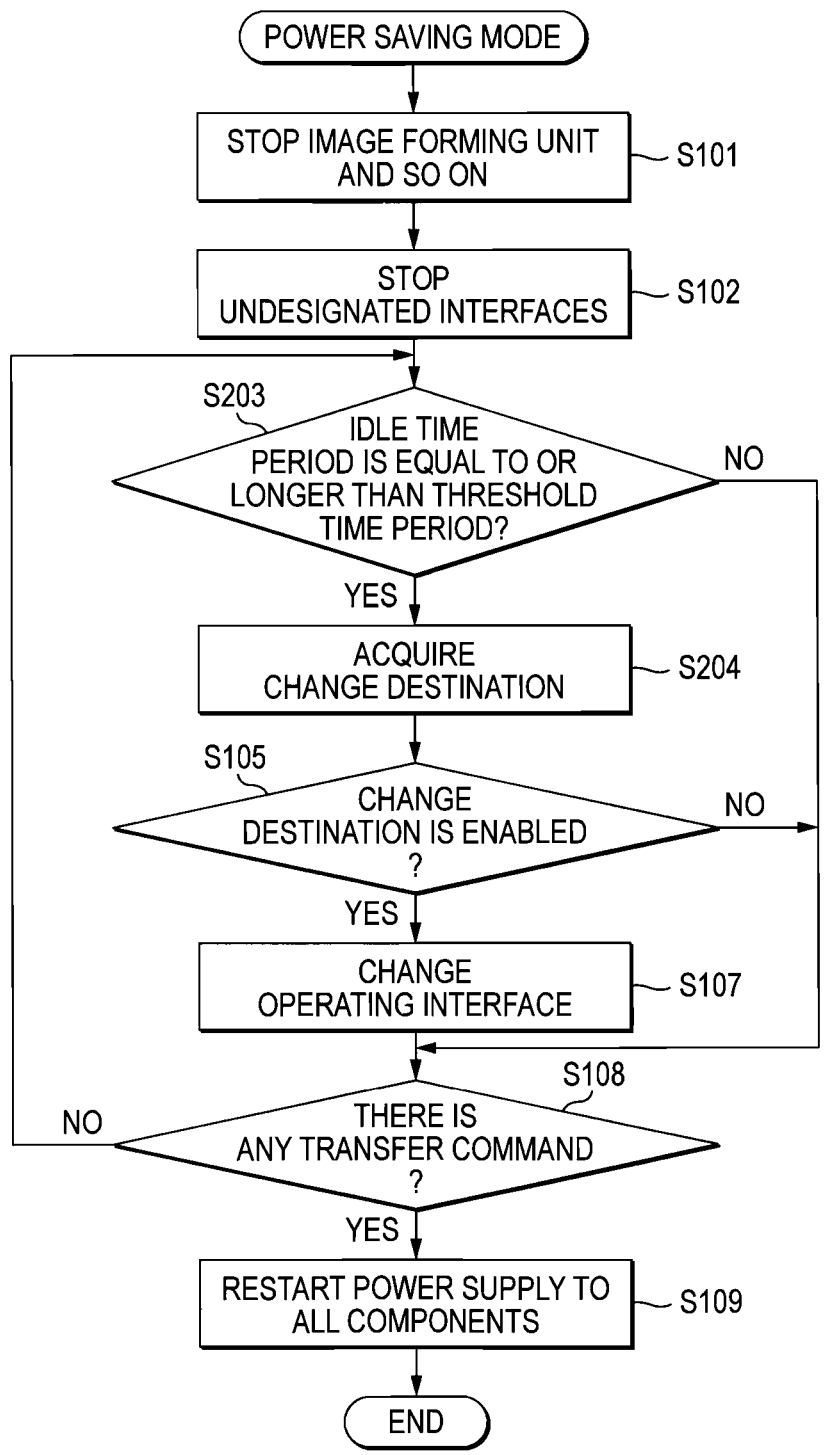
FIG. 6 is a flow chart illustrating a procedure of a power saving process according to a second exemplary embodiment.

Subsequently, a procedure of a power saving mode (one example of a determining process and a changing process) of a second exemplary embodiment will be described with reference to a flow chart of FIG. 6. In the second exemplary embodiment, on the basis of a length of an idle time period, it is determined whether the availability of the operating interface is high or low. This point is different from the first exemplary embodiment, in which it is determined whether the availability of the operating interface is high or low on the basis of the disabled state. In the following description, processes identical to those of the first exemplary embodiment are denoted by the same reference symbols, and the description thereof will be omitted.

In the power saving process of the second exemplary embodiment, in STEP S101 and STEP S102, the supply of power to the image forming unit 1, the image reading unit 2, and interfaces undesignated as interfaces to operate in the power saving mode is cut off. After the power supply of the power is cut off, in STEP S203, it is determined whether an idle time period of interfaces, which are designated as the interfaces to operate in the power saving mode, is equal to or longer than a threshold time period (one example of a determining process). The length of the threshold time period depends on the kind of each interface.

Figure 7:
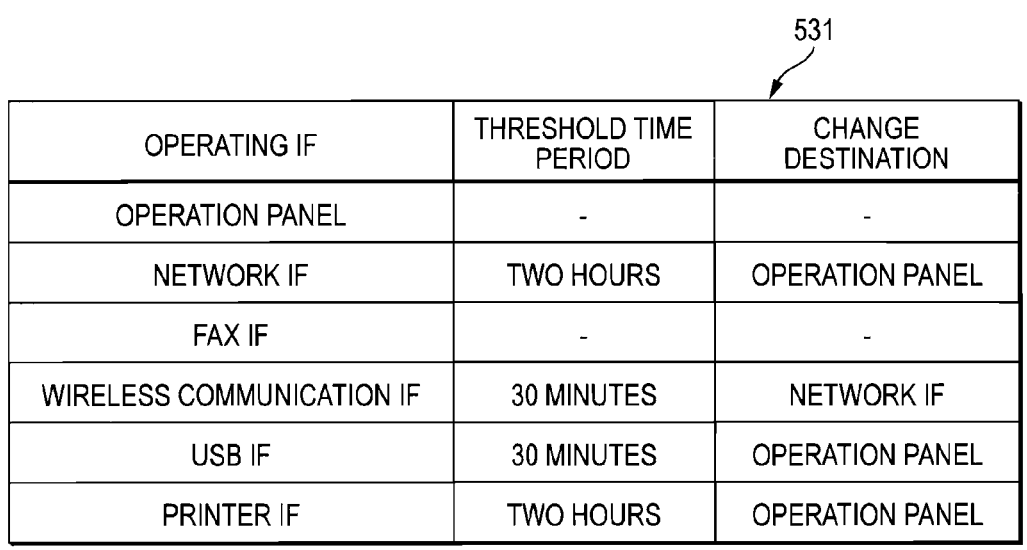
FIG. 7 is a view illustrating an example of a database storing threshold time periods and change destinations in association with interfaces.

Specifically, the power supply controller 53 includes a database 531. The database 531 stores a threshold time period and a changes destination in association with each interface for return, as shown in FIG. 7. The power supply controller 53 reads the threshold time period according to the kind of the operating interface from the database 531. As the change destination, an interface for return assumed to have a frequency of use higher than that of the interface for return which is the change origin is registered in advance. The threshold time period and the change destination registered in the database 531 may be fixed values or variable values. In the case where the threshold time period and the change destination are variable values, the variable values may be changed by user's input, or may be regularly and automatically updated on the basis of the frequency of use of each interface for return, and so on.

A symbol '-' stored as a threshold time period and the change destination means that any threshold time period has not been set. That is, in the present exemplary embodiment, with respect to an interface for return having '-' as the threshold time period, the corresponding interface for return does not become a change target, because the idle time period cannot be equal to or longer than the threshold time period.

In a case where the idle time period is shorter than the threshold time period (NO in STEP S203), the power saving process proceeds to STEP S108, and it is determined whether there is any received transition command. Incidentally, in the second exemplary embodiment, the length of the idle time period is determined, and the communication state is not a subject to be determined. Therefore, it is unnecessary to determine the communication state of the original operating interface, and thus STEP S121 to STEP S124 of the first exemplary embodiment are not performed.

In a case where the idle time period is equal to or longer than the threshold time period (YES in STEP S203), in STEP S204, an interface for return which is a change destination corresponding to an operating interface, the idle time period of which is equal to or longer than the threshold time period, is acquired from the database 531. Then, in STEP S105, it is determined whether the acquired interface for return is enabled.

In a case where the acquired interface for return is disabled (NO in STEP S105), the power saving process returns to STEP S204, and an interface for return which is a change destination corresponding to the interface for return is acquired. That is, an interface for return to be a change destination is determined again.

On the other hand, in a case where the acquired interface for return is enabled (YES in STEP S105), in STEP S107, the interface for return changes into an operating interface, and the operating interface, the idle time period of which is equal to or longer than the threshold time period, changes into an idle interface (one example of a changing process). Incidentally, in the second exemplary embodiment, since the original operating interface does not return to an operating interface, it is unnecessary to store information on the operating interface, and thus STEP S106 of the first exemplary embodiment is not performed. Next, the power saving process proceeds to STEP S108. STEP S108 and the subsequent process are the same as those of the first exemplary embodiment.

In the power saving process of the second exemplary embodiment, in the power saving mode, in a case where there is any operating interface that has not been used for a long time, an idle interface having high availability changes into an operating interface. With respect to an interface having a long idle time period, it can be considered that there are few opportunities for the user to use that interface, and most of users who do not usually use that interface feel inconvenience. For this reason, by changing an idle interface having a higher frequency of use into the operating interface, it is possible to improve usability for many users.

Incidentally, in the second exemplary embodiment, the change destination of the operating interface is automatically acquired from the database 531. Alternatively, it may be inquired of the user as the first exemplary embodiment. In the first exemplary embodiment, the change destination of the operating interface is inquired of the user. Alternatively, it may be automatically acquired from the database 531 as the second exemplary embodiment.

In the second exemplary embodiment, after the operating interface is changed, a threshold time period which becomes a threshold value for the idle time period of the operating interface which is the change destination is acquired from the database 531. Alternatively, a common timeout period may be set, and this timeout period may be used as the threshold time period, regardless of the kind of the operating interface.

In a case where a time period shorter than a predetermined time period to be a condition for transition to the power saving mode is registered as the threshold time period, immediately after transition to the power saving mode, the condition of STEP S204 is satisfied. With respect to an interface for return which is very unlikely to receive a transition command, for example, a time period (for example, '0') shorter than the predetermined time period which is the condition for transition to the power saving mode may be set as the threshold time period, and the operating interface may be changed immediately after transition to the power saving mode.

In the second exemplary embodiment, the idle time period is defined as the duration when the MFP 100 is not used (i.e., a time period elapsed from when the MFP 100 has been lately used, for example, when printing or panel operation has been lately performed), and an interface for return which is a power supply destination is changed according to the length of the idle time period. For example, if switching from the ready mode to the power saving mode is performed, time measurement may start, and the interface for return which is a power supply destination may be changed according to the length of the measured time.

As describe above, the MFP 100 of each exemplary embodiment has the plurality of interfaces capable of receiving a transition command. Further, in the power saving mode, the MFP 100 determines whether the availability of an operating interface is high or low. If it is determined that the availability is low, power supply to at least one of the idle interfaces starts. Therefore, it can be expected to improve the availability of operating interfaces of the entire MFP 100, and thus a reduction in user's inconvenience can be expected.

[Modifications to Exemplary Embodiments]

The above-described exemplary embodiments are merely examples, and do not limit the present invention. Therefore, the present invention can be improved and modified in various forms without departing from the scope. For example, the present invention is not limited to the MFP, but is applicable to any apparatuses having an image forming function or an image reading function, such as a printer, a copy machine, a scanner, and a FAX.

In the above-described exemplary embodiments, the power supply controller 53 manages the supply of power to all interfaces for return. However, the present invention is not limited thereto. For example, a dedicated board for managing power supply may be provided for each interface for return. In this case, if there is an operating interface, power is supplied even to a dedicated board corresponding to that operating interface, such that an input of a transition command is monitored. On the other hand, if there is an idle interface, supply of power to a dedicated board corresponding to that idle interface is cut off. In the power saving mode, the supply of power to units other than the operating interface and its dedicated board is cut off. At this time, the supply of power to the control unit 30 is also cut off. The supply of power to the operating interfaces is cut off according to the idle time period, the priorities, or the like. If an operating interface receives a transition command, the supply of power to all units including the control unit 30 restarts.

In the above-described exemplary embodiments, after an interface for return which is a change destination is activated, an interface for return which was the previous operating interface changes into an idle interface. However, this change is not necessarily required. That is, even if the previous operating interface is active, if a new interface for return is added, it is possible to improve the availability of the operating interfaces of the entire MFP 100. Further, in the above-described exemplary embodiments, after the power supply destination is changed, if communication to the original operating interface is recovered, the power supply state returns to that before the change. However, this return is not necessarily required.

Further, in the above-described exemplary embodiments, when the operating interface is changed, one of the idle interfaces changes into an operating interface. However, the number of idle interfaces to change into operating interfaces is not limited to one. That is, a plurality of idle interfaces may change into operating interfaces. If the number of operating interfaces increases, usability is improved.

In the above-described exemplary embodiments, it is determined whether the availability of an operating interface is high or low on the basis of the communication state and the idle time period. However, information for the determination is not limited thereto. For example, the information for the determination may be the number of information processing apparatuses which are connected through the operating interfaces. In this case, for example, it can be determined that as the number of information processing apparatuses decreases, the availability decreases.

What is claimed is:

1. An image forming apparatus comprising:
an image forming unit configured to form an image;
a power supply controller configured to control the image forming apparatus to operate in a power saving mode, in which an amount of power consumed in the image forming apparatus is less than in a normal mode, wherein the power supply controller is configured to perform in either one of the power saving mode and the normal mode; and
a plurality of interfaces, each configured to receive a transition command for transitioning from the power saving mode to the normal mode,
wherein the power supply controller is configured to perform, in the power saving mode, processes comprising:
supplying power to an operating interface, the operating interface being at least one of the plurality of interfaces;
suspending the power to an idle interface, the idle interface being at least one of the plurality of interfaces and different from the operating interface;
determining whether a particular condition is satisfied regarding the operating interface, wherein the particular condition comprises availability of the operating interface; and
supplying power to an idle interface, which becomes an alternative operating interface other than the operating interface, in a case where the power supply controller determines that the particular condition is satisfied;
wherein the availability of the operating interface comprises high availability and low availability;
wherein the power supply controller determines that the particular condition is satisfied when the availability of the operating interface is low availability; and
wherein, in the power saving mode:
when the availability of the operating interface is not low availability, the operating interface functions as an interface for return that is configured to, upon receiving the transition command, cause the power supply controller to control the image forming apparatus to switch from performing in the power saving mode to performing in the normal mode, and
when the availability of the operating interface is low availability, the idle interface is supplied with power to become the alternative operating interface, which functions as the interface for return that is configured to, upon receiving the transition command, cause the power supply controller to control the image forming apparatus to switch from performing in the power saving mode to performing in the normal mode.

2. The image forming apparatus according to claim 1, wherein in the case where the power supply controller determines that the availability of the operating interface is low, the power supply controller cuts off the power supply to the operating interface.

3. The image forming apparatus according to claim 1, wherein the power supply controller is further configured to:
determine whether the operating interface is disabled; and
in a case where the operating interface is determined to be disabled, determine that the availability of the disabled interface is low.

4. The image forming apparatus according to claim 3, wherein the power supply controller is further configured to perform processes comprising:
diagnosing whether the disabled interface, which has been determined to be disabled, becomes enabled; and
in a case where the disabled interface is diagnosed to become enabled, cutting off the power supply to the interface having been started in the supplying power process.

5. The image forming apparatus according to claim 1, wherein the power supply controller is further configured to perform a selecting process of, in a case where the power supply controller determines that the availability of the operating interface is low, allowing a user to select an idle interface from among the idle interfaces, and
wherein the power supply controller starts to supply power to the idle interface selected in the selecting process.

6. The image forming apparatus according to claim 5, wherein the power supply controller is further configured to perform a checking process of checking whether the idle interface selected in the selecting process is enabled, and
wherein in a case where the selected idle interface checked in the checking process is disabled, the power supply controller in the selecting process allows the user to select another idle interface other than the disabled idle interface.

7. The image forming apparatus according to claim 5, wherein when the idle interface is disabled, the disabled idle interface is prevented from being selected.

8. The image forming apparatus according to claim 1, wherein the power supply controller does not supply power to a disabled idle interface in the supplying power process.

9. The image forming apparatus according to claim 1, wherein in a case where a duration when the operating interface is not used is equal to or longer than a threshold time period, the power supply controller determines that the availability of the operating interface is low.

10. The image forming apparatus according to claim 1, wherein the power supply controller is further configured to perform a selecting process of, in a case where the power supply controller determines that the availability of the operating interface is low, allowing a user to select an idle interface from among the idle interfaces, and
wherein the power supply controller starts to supply power to the idle interface selected in the selecting process.

11. The image forming apparatus according to claim 10, wherein the power supply controller is further configured to perform a checking process of checking whether the idle interface selected in the selecting process is enabled, and
wherein in a case where the selected idle interface checked in the checking process is disabled, the power supply controller in the selecting process allows the user to select another idle interface other than the disabled idle interface.

12. The image forming apparatus according to claim 1, wherein the power supply controller does not supply power to a disabled idle interface in the supplying power process.

13. The image forming apparatus according to claim 1, wherein in a case where a duration when the operating interface is not used is equal to or longer than a threshold time period, the power supply controller determines that the availability of the operating interface is low.

14. The image forming apparatus according to claim 1, wherein determining whether a particular condition is satisfied comprises determining whether at least one of the following states is satisfied:
   a state in which the operating interface is broken or communication with the operating interface is disconnected;
   a state in which communication with the operating interface is unstable; and
   a state in which an idle time period of interfaces designated to operate in the power saving mode is greater than or equal to a predetermined threshold time period; and
wherein the power supply controller is configured to supply power to the idle interface when at least one of the states is determined to be satisfied.

15. An image reading apparatus comprising:
an image reading unit configured to read an image;
a power supply controller configured to control the image reading apparatus to operate in a power saving mode, in which an amount of power consumed in the image reading apparatus is less than in a normal mode, wherein the power supply controller is configured to perform in either one of the power saving mode and the normal mode; and
a plurality of interfaces, each configured to receive a transition command for transitioning from the power saving mode to the normal mode,
wherein the power supply controller is configured to perform, in the power saving mode, processes comprising:
   supplying power to an operating interface, the operating interface being at least one of the plurality of interfaces;
   suspending the power to an idle interface, the idle interface being at least one of the plurality of interfaces and different from the operating interface;
   determining whether a particular condition is satisfied regarding the operating interface, wherein the particular condition comprises availability of the operating interface; and
   supplying power to an idle interface, which becomes an alternative operating interface other than the operating interface, in a case where the power supply controller determines that the particular condition is satisfied;
wherein the availability of the operating interface comprises high availability and low availability;
wherein the power supply controller determines that the particular condition is satisfied when the availability of the operating interface is low availability; and
wherein, in the power saving mode:
   the operating interface functions as an interface for return that is configured to, upon receiving the transition command, cause the power supply controller to control the image forming apparatus to switch from performing in the power saving mode to performing in the normal mode, and
   when the availability of the operating interface is low availability, the idle interface is supplied with power to become the alternative operating interface, which functions as the interface for return that is configured to, upon receiving the transition command, cause the power supply controller to control the image forming apparatus to switch from performing in the power saving mode to performing in the normal mode.

16. The image forming apparatus according to claim 15, wherein in the case where the power supply controller determines that the availability of the operating interface is low, the power supply controller cuts off the power supply to the operating interface.

17. The image forming apparatus according to claim 15, wherein the power supply controller is further configured to:
   determine whether the operating interface is disabled; and
   in a case where the operating interface is determined to be disabled, determine that the availability of the disabled interface is low.

18. The image forming apparatus according to claim 17, wherein the power supply controller is further configured to perform processes comprising:
   diagnosing whether the disabled interface, which has been determined to be disabled, becomes enabled; and
   in a case where the disabled interface is diagnosed to become enabled, cutting off the power supply to the interface having been started in the supplying power process.

19. A multi-function peripheral comprising:
an image forming unit configured to form an image;
an image reading unit configured to read an image;
a power supply controller configured to control the multi-function peripheral to operate in a power saving mode, in which an amount of power consumed in the multi-function peripheral is less than in a normal mode, wherein the power supply controller is configured to perform in either one of the power saving mode and the normal mode; and
a plurality of interfaces, each configured to receive a transition command for transitioning from the power saving mode to the normal mode,
wherein the power supply controller is configured to perform, in the power saving mode:
   supplying power to an operating interface, the operating interface being at least one of the plurality of interfaces;
   suspending the power to an idle interface, the idle interface being at least one of the plurality of interfaces and different from the operating interface;
   determining whether a particular condition is satisfied regarding the operating interface, wherein the particular condition comprises availability of the operating interface; and
   supplying power to an idle interface, which becomes an alternative operating interface other than the operating interface, in a case where the power supply controller determines that the particular condition is satisfied;
wherein the availability of the operating interface comprises high availability and low availability;

wherein the power supply controller determines that the particular condition is satisfied when the availability of the operating interface is low availability; and wherein, in the power saving mode:
the operating interface functions as an interface for return that is configured to, upon receiving the transition command, cause the power supply controller to control the image forming apparatus to switch from performing in the power saving mode to performing in the normal mode, and when the availability of the operating interface is low availability, the idle interface is supplied with power to become the alternative operating interface, which functions as the interface for return that is configured to, upon receiving the transition command, cause the power supply controller to control the image forming apparatus to switch from performing in the power saving mode to performing in the normal mode.

* * * * *